United States Patent [19]

Lohan

[11] Patent Number: 5,258,195
[45] Date of Patent: Nov. 2, 1993

[54] FRESH PASTA PRODUCT AND PROCESS OF MANUFACTURE

[76] Inventor: Michael J. Lohan, 1 Glen La., Laurel Hollow, N.Y. 11791

[21] Appl. No.: 946,653

[22] Filed: Sep. 18, 1992

[51] Int. Cl.⁵ .............................................. A23P 1/08
[52] U.S. Cl. .................................... 426/557; 426/451; 426/622
[58] Field of Search ................ 426/557, 451, 622, 615

[56] References Cited

U.S. PATENT DOCUMENTS

| | | | |
|---|---|---|---|
| 1,220,205 | 3/1917 | Desmarais | 426/557 |
| 2,677,613 | 5/1954 | Shiah | 426/557 |
| 3,949,101 | 4/1976 | Murthy | 426/557 |
| 4,000,330 | 12/1976 | Sipos et al. | 426/557 |
| 4,044,165 | 8/1977 | Baumann | 426/557 |
| 4,120,989 | 10/1987 | Grindstaff et al. | 426/557 |
| 4,539,214 | 9/1985 | Winter et al. | 426/557 |
| 4,693,900 | 9/1987 | Molinari | 426/128 |
| 4,830,867 | 5/1989 | Vemura et al. | 426/557 |
| 4,965,082 | 10/1990 | Chawan et al. | 426/331 |
| 5,124,168 | 6/1992 | McMillin et al. | 426/451 |

FOREIGN PATENT DOCUMENTS 3915009  11/1989  German Democratic Rep. ............... 426/557

*Primary Examiner*—Jeanette Hunter
*Assistant Examiner*—Mary S. Mims

[57] ABSTRACT

A fresh pasta product of glutinous flour, preferably durum semolina flour, Jerusalem artichoke flour and water, and a process of manufacturing this product is disclosed.

8 Claims, No Drawings

FRESH PASTA PRODUCT AND PROCESS OF MANUFACTURE

FIELD OF THE INVENTION

The present invention relates to making alimentary paste or pasta products without the customary drying step. The terms "alimentary paste" or "pasta", as used herein, refer to the flour and water mixtures commonly known as pasta. Without the customary drying step, the pasta product is referred to as "fresh pasta".

BACKGROUND OF THE INVENTION

The manufacture of dried uncooked pasta such as spaghetti, macaroni, noodles, ziti, etc. involves mixing flour and water to form a paste or feedstock. The paste may be extruded through a die under pressure and at an elevated temperature, cut into appropriate lengths and shapes, and dried; or pressed into a sheeter-kneader to convert the paste into flat sheets which are then cut into various shapes, which in turn, are dried.

Drying is the most time-consuming step in the process. The extrudate or sheeting generally has a moisture content of at least 25% by weight, which must be reduced to a value of about 10%-13% to permit storage at ambient conditions. To accomplish such drying may require from about 18-36 hours under carefully controlled conditions of relative humidity of the air, its temperature and the rate of air circulation in the drying area. Since the pasta is in its final shape, this is a very delicate operation. The rate of drying will affect the integrity of the product. Rapid drying may cause warping or cracking of the pasta. Drying too slowly may also affect the product's integrity, but in addition, may cause the product to sour or become moldy.

In U.S. Pat. No. 3,949,101, the drying time disclosed is 34 hours at 100° F. In U.S. Pat. No. 4,000,330, an 18 hour drying schedule at 41° C. with a programmed decrease of relative humidity to 65% is disclosed. Using formulations containing whey protein and an emulsifier containing mono- and diglycerides, as in U.S. Pat. No. 4,120,989, can reduce the drying time to 4-6 hours. In U.S. Pat. No. 4,539,414, the drying time is drastically reduced by simultaneously cooking and drying the cut pasta product with superheated steam at a temperature of 102°-140° C. for 7-20 minutes. This latter product is not the substantially dry product that is customarily found in packages on the shelves of the supermarket.

Recently, pasta products requiring no conventional drying step have been introduced. They can be packaged in a pouch made of vapor barrier material and sold as a "fresh pasta" product. As fresh pasta, it cooks in a shorter time than conventional dry pasta; and does not stick or lump when leftovers are stored in the refrigerator. The fresh pasta products of the prior art are characterized by containing one or two or more essential ingredients besides the glutinous flour and water commonly used for preparing dry pasta. These additional ingredients include eggs, whole or the white portions, optionally with olive oil or the like. In U.S. Pat. No. 4,965,082, up to 10% ethyl alcohol is substituted for eggs, in the preparation of the fresh pasta product.

SUMMARY OF THE INVENTION

This invention relates to a fresh pasta product having all the desirable characteristics mentioned above, but is prepared without including eggs or alcohol in the preparation formula.

Specifically, this invention involves the preparation of a fresh pasta product from glutinous flour, water and Jerusalem artichoke flour. Highly acceptable fresh pasta products can be prepared by utilizing standard pasta processing techniques, e.g. the "Taresani" pasta production system, with these ingredients.

In performing the process of this invention, a feedstock comprised of glutinous flour, water and Jerusalem artichoke flour is utilized. The term "glutinous flour" as used herein is intended to include and describe flours which provide a self-supporting paste when mixed with water. The self-supporting paste, once shaped, will substantially retain its original form under ambient conditions or after subsequent processing, such as drying or cooking.

Semolina flour, also referred to as "semolina" herein, is a common, hard, coarse, wheat flour obtained from durum wheat. The definition for semolina flour is generally a flour obtained from durum wheat which passes through a 20 mesh sieve with not more than 3% by weight passing through a 100 mesh sieve. There are different grades of semolina having different glutinous properties. Both high grade and low grade semolina flours are intended to be included in the glutinous flours suitable for this invention. Other coarse, glutinous flours, obtained from more uncommon grains may be used in place of semolina and are intended to be included within the scope of the term "glutinous flour" as used herein. The fine flours may be preferred where it is difficult to obtain adequate blending with water from the equipment utilized.

The only requirement for the flour is that it provide a self-supporting paste upon admixture with water. The glutinous flour preferably comprises at least 75% by weight of the dry ingredients used in the feedstock. Preferred glutinous flours are semolina and durum flour. Other additives, including seasonings, vitamins, dyes, flavorings, such as cheese, beef and chicken, and vegetable solids such as spinach, may be added for flavor, color, nutrition or other additive effect.

Water is a necessary part of the feedstock for the extrusion or sheeting process of this invention since glutinous flours, such as semolina flour, do not have a water content sufficiently high to provide a low viscosity paste which can be extruded or formed into sheets without significant cooking of the paste. Preferred feedstocks exhibit a moisture content greater than about 18 weight percent. However, lower values moisture content in the feedstock are suitable where flow modifiers are used. Semolina flour typically has a moisture content of 12-15 weight percent. In practicing this invention, the quantity of added water provides a total moisture level for the feedstock which does not exceed 26% by weight (including the moisture present in the flour(s) used). The total moisture level for the feedstock preferably does not exceed about 25% be weight.

The term "water", as used herein, refers to potable water, including tap water, well water, spring water and the like, as well as to substantially pure forms of water, such as distilled water. If desired, the necessary water can be added as milk, broths, vegetable juices and the like.

The third essential ingredient which may comprise anywhere from 2 to 25% of the solids in the feedstock, preferably about 5-20%, is Jerusalem artichoke flour. This flour is prepared by dehydrating whole tubers of the Jerusalem artichoke. The flour, as identified in the "USDA Handbook 8 Composition of Foods" is considered a natural product containing a high level of fructooldigosaccharides. It has an extremely low calorific value of less than 1.5 calories per gram.

The fresh pasta product of this invention after extrusion or sheeting of the feedstock consists essentially of at least 75% glutinous flour, from about 2-15%, preferably about 4-10% of Jerusalem artichoke flour and about 10-15% moisture. As stated previously, the feedstock consists essentially of at least 75% glutinous flour, about 2-25% Jerusalem artichoke flour and about 10-25% water.

The moisture content of the glutinous flour, the feedstock, and the fresh pasta product may be determined by the procedures set forth in the 9the Ed., "Association of Official Analytical Chemists" (AOAC), Method 13.112, which is incorporated herein by reference. Other methods are also suitable but the AOAC procedures, incorporated above, should be used to define the moisture values set forth herein.

It is contemplated that when the freshly formed shaped pasta is packaged in a vapor barrier pouch, it may be desirable to add to the feedstock a suitable amount of an osmophilic yeast and mold inhibitor as for example up to 0.2% by weight based on the feedstock of sodium propionate, potassium propionate, sodium sorbate or potassium sorbate or mixtures thereof.

When the fresh pasta is placed in the vapor barrier pouches at the moment of forming (while still warm) so that the pasta is not exposed to ambient conditions before packaging, it may not be necessary to use yeast or mold inhibitor. However, in order to be sure that no growth takes place in the packaged vapor-barrier pouches, several options are available. Yeast and mold inhibitor may be incorporated in the feedstock in one way or another, or the freshly packaged vapor-barrier pouches can be heat treated by known methods including microwave heating to thereby inhibit the growth of any osmophilic fungi that may have entered the pouch at the time of packaging.

Two useful additives, salt and glycerol monostearate, are also commonly found in commercial fresh pastas. Salt provides flavor while glycerol monostearate functions as an emulsifier or lubricant, i.e., flow modifier, which reduces the viscosity of the alimentary paste, making sheeting or extrusion easier. However, the addition of flow modifier or "modifying agents" is not essential to this invention.

The components of the feedstock may be separately introduced to the extruder or they may be premixed to form a preliminary paste. Commercial equipment is available for handling both types of feedstocks. To ensure a uniform product however, separate metering of the feedstock components is often preferred.

The term "extruder, as used herein, refers to those devices which generally comprise a threaded screw positioned within a barrel having a means for receiving components to be mixed, such as a feed hopper positioned at one end, a means for discharging mixed components at the opposite end of the device, and a means for rotating the screw within the barrel. An example of a discharging means is a die having holes or rectangular slots for the passage of mixed materials, positioned at the end of the screw. The temperature within an extruder may be controlled by the use of a water jacket which surrounds the barrel. Conventional extruders utilized in the preparation of alimentary pastes or plastics are well suited for this invention. These include both single screw and twin screw extruders. Examples of suitable extruders include those marked by Brabender, Mapimpianti (GF 20 series), Buhler, DeMaco, and Braibanti.

The alimentary paste or dough is forced through the opening(s) in of the extruder die to obtain the desired shape. The paste passes through the die due to the internal pressure generated by the rotating screw or screws. The extruded paste may be cut into pieces of desired lengths. Cutting generally occurs at the outlet of the extruder die. Cutting is not essential to the practice of this invention since the alimentary paste or dough may be formed into desired lengths by merely pulling the extrudate away from the die. All conventional pasta shapes may be produced in practicing this invention.

The temperature of the paste may vary within the extruder because of the heat that is generated by friction at different points within the extruder. The temperature of the paste can also vary because it may pass through different cooling or heating zones along the length of the extruder barrel. This may be desired where blending is intensified at separate locations in the extruder where additives to the paste may be added downstream of the feed hopper. However, the highest temperature experienced by the alimentary paste should be a temperature sufficient to permit flow and yet sufficiently low so as to maintain the paste uncooked, preferably below 190° F. (88° C.). The process may be performed continuously, semi-continuously or batch-wise.

It is preferable to utilize a temperature that is at or above 120° F. and which is sufficiently high to maintain the internal pressure on the extruder die below about 250% of the values experienced at standard conditions. The combination of an extruder barrel temperature of about 120° F. and a moisture content of about 30 weight percent will generate a pressure below 2000 psig.

It is contemplated that instead of forcing the dough or paste of the invention through a die, the dough could be sheeted by conveying the dough through pressure rollers. The sheeted product could then be handled in the same way as the extruded product (i.e. cut into pieces and packaged in vapor barrier pouches).

The invention will be more clearly understood by referring to the example which follows. This example represents the best mode contemplated for practicing the invention but should not be considered limitative in any way.

EXAMPLE

To produce about 130 pounds of the fresh pasta product, the following are used:
  100 pounds durum semolina flour;
  5 pounds Jerusalem artichoke flour; and
  5 quarts natural spring water.

These ingredients are mixed in a commercial mixer to form the feedstock. The feedstock is then pressed in a sheeter-kneader capable of producing 500 pounds of fresh pasta/hour to convert the pasta into flat sheets. The sheets are then cut in conventional equipment to produce the fresh pasta product in the desired shape and size.

Once produced, the product is refrigerated (to eliminate bacteria) and then packed in a gas flushed, usually with nitrogen, heat sealed tray under vacuum. The shelf life of the thus packaged product is 30-40 days.

The product may also be packaged in vapor barrier bags about 6.5 inches×8.0 inches of polyester film, about 4-5 mils thick, and displayed in the refrigerated cases of the supermarket.

While the present invention has been disclosed and described herein in what is believed to be the most practical and preferred steps, it is recognized that departures can be made therefrom within the scope of the invention. Therefore, this invention is not to be limited to the details disclosed herein but is to be accorded the full scope of the claims so as to embrace any and all equivalents of the process and product claims.

I claim:

1. A process for preparing shaped pieces of a fresh pasta product without using any substantial amount of alcohol or egg which comprises:
   (a) preparing a feedstock consisting essentially of glutinous flour, Jerusalem artichoke flour and water to form an alimentary paste or dough having a total moisture content up to 25% and about 2-25% of Jerusalem artichoke flour;
   (b) extruding or sheeting said paste or dough under pressure and at a temperature sufficient to reduce viscosity so as to be extrudable or sheetable at a desired pressure; and
   (c) forming said extrudate or said sheet into individual fresh pasta pieces.

2. The process of claim 1 wherein said pasta pieces are packaged and sealed in a container made of vapor barrier material.

3. A process as in claim 1 wherein the glutinous flour is selected from the group consisting of semolina flour, durum flour and mixtures thereof.

4. A process as in claim 1 wherein the feedstock is premixed prior to extruding or sheeting.

5. A process as in claim 1 wherein the feedstock further comprises additives selected from the group consisting of: non-glutinous flour, seasoning, flavoring, dye, vitamins, dried vegetable, and mixtures thereof, with the concentration of glutinous flour being at least 75% by weight of the ingredients on a dry basis in said feedstock.

6. A process as in claim 1 wherein the feedstock additionally comprises glycerol monostearate.

7. A fresh pasta product consisting essentially of at least 75% glutinous flour, about 2-15% Jerusalem artichoke flour, and about 10-15% water, all percentages by weight, and no substantial amount of alcohol or egg.

8. A product as in claim 7 wherein said glutinous flour is durum semolina flour.

* * * * *